(12) United States Patent
Li et al.

(10) Patent No.: US 11,588,394 B2
(45) Date of Patent: Feb. 21, 2023

(54) REDUCED CURRENT SHARING RIPPLE

(71) Applicant: AES Global Holdings PTE Ltd., Singapore (SG)

(72) Inventors: Zhizhi Li, Kwun Tong KLN (HK); Ka Kit Li, Yuen Long (HK); Chung Hang Ling, Tsuen Wan (HK); Hing Hei Tsang, Ma On Shan (HK); Chi Chung Wong, Shatin (HK); Shu Yuen Chow, Kowloon (HK)

(73) Assignee: AES Global Holdings PTE Ltd., Singapore (SG)

( * ) Notice: Subject to any disclaimer, the term of this patent is extended or adjusted under 35 U.S.C. 154(b) by 0 days.

(21) Appl. No.: 17/321,420

(22) Filed: May 15, 2021

(65) Prior Publication Data
US 2022/0368213 A1   Nov. 17, 2022

(51) Int. Cl.
*H02M 1/14* (2006.01)
*H02M 1/44* (2007.01)
*H02M 7/04* (2006.01)
*H02J 5/00* (2016.01)

(52) U.S. Cl.
CPC ............... *H02M 1/14* (2013.01); *H02J 5/00* (2013.01); *H02M 1/44* (2013.01); *H02M 7/04* (2013.01)

(58) Field of Classification Search
CPC .. H02M 1/14; H02M 1/44; H02M 7/04; H02J 5/00
USPC .......... 323/283, 234, 65, 39; 307/52, 73, 82; 363/65, 39
See application file for complete search history.

(56) References Cited

U.S. PATENT DOCUMENTS

| 8,766,478 B2 * | 7/2014 | Liu ........................... H02J 4/00 323/283 |
| 10,063,140 B2 | 8/2018 | Soleno et al. |
| 2008/0205095 A1 * | 8/2008 | Pinon .................. H02M 3/1584 363/39 |

* cited by examiner

*Primary Examiner* — Arnold M Kinkead

(57) ABSTRACT

In the parallel operation of power supply units, a high line ripple current may be observed in output when the power supply units (PSUs) are supplied with different inputs. For example, a high line ripple current may be observed when PSUs were supplied with different line frequency inputs and/or when PSUs were supplied with different phase angle input lines. A low pass filter is in a control loop which is capable of filtering the line frequency to get an average current reference signal. The average current reference signal is compared with the real time output current to generate an error signal. This error signal is fed back to a voltage control loop to adjust the output in order to compensate the line ripple.

20 Claims, 6 Drawing Sheets

RECEIVE A CURRENT SHARING ERROR SIGNAL BASED ON A DIFFERENCE BETWEEN AT LEAST A FIRST CURRENT SUPPLIED BY THE FIRST POWER SUPPLY UNIT AND A SECOND CURRENT SUPPLIED BY A SECOND POWER SUPPLY UNIT WHERE THE FIRST POWER SUPPLY UNIT AND THE SECOND POWER SUPPLY UNIT ARE CONNECTED IN PARALLEL TO SHARE THE SUPPLYING OF A LOAD CURRENT
402

RECEIVE A CURRENT REFERENCE SIGNAL AND A CURRENT FEEDBACK SIGNAL
404

BASED ON THE CURRENT SHARING ERROR SIGNAL, THE CURRENT REFERENCE SIGNAL, AND THE CURRENT FEEDBACK SIGNAL, ADJUSTING AN ERROR INPUT TO A VOLTAGE CONTROL LOOP THAT CONTROLS THE OUTPUT VOLTAGE OF THE FIRST POWER SUPPLY UNIT.
406

*FIG. 4*

REDUCED CURRENT SHARING RIPPLE

TECHNICAL FIELD

Aspects of the disclosure are related to the field of power supply units, and in particular, to reducing current ripple when multiple power supplies are connected in parallel.

BACKGROUND

This section provides background information related to the present disclosure which is not necessarily prior art.

A power supply unit is an electrical device that supplies electric power to an electrical load. Indeed, power supply units typically have a power input connection, which receives energy in the form of electric current from a source, and one or more power output connections that deliver current to the load. The primary function of a power supply is to convert electric current from a source to a correct voltage, current, and frequency to power a load. Indeed, a power supply unit may perform a variety of functions, such as, but not limited to, power conversion, alternating current to direct current (AC-DC) or DC-DC conversion, adjusting voltage levels, and providing backup power during power grid outages.

A power supply system typically includes multiple power sources (or power supply units) that provide power and power management functionality including load current sharing among the multiple power sources.

Unfortunately, conventional power supply systems suffer numerous deficiencies with respect to current sharing. For example, when multiple power supplies are connected in parallel to share the supply of a load current, and one or more of the power supplies are supplied with different inputs (e.g., different phases or different frequencies), the output current supplied by power supplies may exhibit a large ripple current.

SUMMARY

One or more embodiments described herein, among other benefits, solve one or more of the foregoing or other problems in the art by providing systems, methods, and non-transitory computer readable media for reducing the current ripple of power supplies connected in parallel. In some implementations, the technology described includes A direct current (DC) power supply system, comprising: a plurality of power supply units configured in parallel to share load current; and, the plurality of power supply units comprising: a first power supply unit to combine a current feedback signal and a current reference signal to produce a first current error signal that affects a voltage control loop of the first power supply unit.

In some implementations, the technology described includes a method of controlling a first power supply unit, comprising: receiving a current sharing error signal based on a difference between at least a first current supplied by the first power supply unit and a second current supplied by a second power supply unit where the first power supply unit and the second power supply unit are connected in parallel to share a supplying of a load current; receiving a current reference signal and a current feedback signal; and, based on the current sharing error signal, the current reference signal, and the current feedback signal, adjusting an error input to a voltage control loop that controls an output voltage of the first power supply unit.

In some implementations, the technology described includes a power supply system, comprising: control circuitry configured to receiving a current sharing error indicator that is based on a difference between at least a first current supplied by a first power supply unit and a second current supplied by a second power supply unit where the first power supply unit and the second power supply unit are connected in parallel to share a supplying of a load current; the control circuitry further configure to receive a current reference indicator and a current feedback indicator; and, based on the current sharing error indicator, the current reference indicator, and the current feedback indicator, the control circuitry is to adjust an error input indicator to a voltage control loop that controls an output voltage of the first power supply unit.

Additional features and advantages of the present application will be set forth in the description which follows, and in part will be obvious from the description, or may be learned by the practice of such example embodiments.

BRIEF DESCRIPTION OF THE DRAWINGS

In order to describe the manner in which the above-recited and other advantages and features can be obtained, a more particular description is set forth and will be rendered by reference to specific examples thereof which are illustrated in the appended drawings. Understanding that these drawings depict only typical examples and are not considered to be limiting of its scope. Implementations will be described and explained with additional specificity and detail through the use of the accompanying drawings.

FIG. 4 is a flowchart illustrating a method of operating a power supply system.

Figure 1:
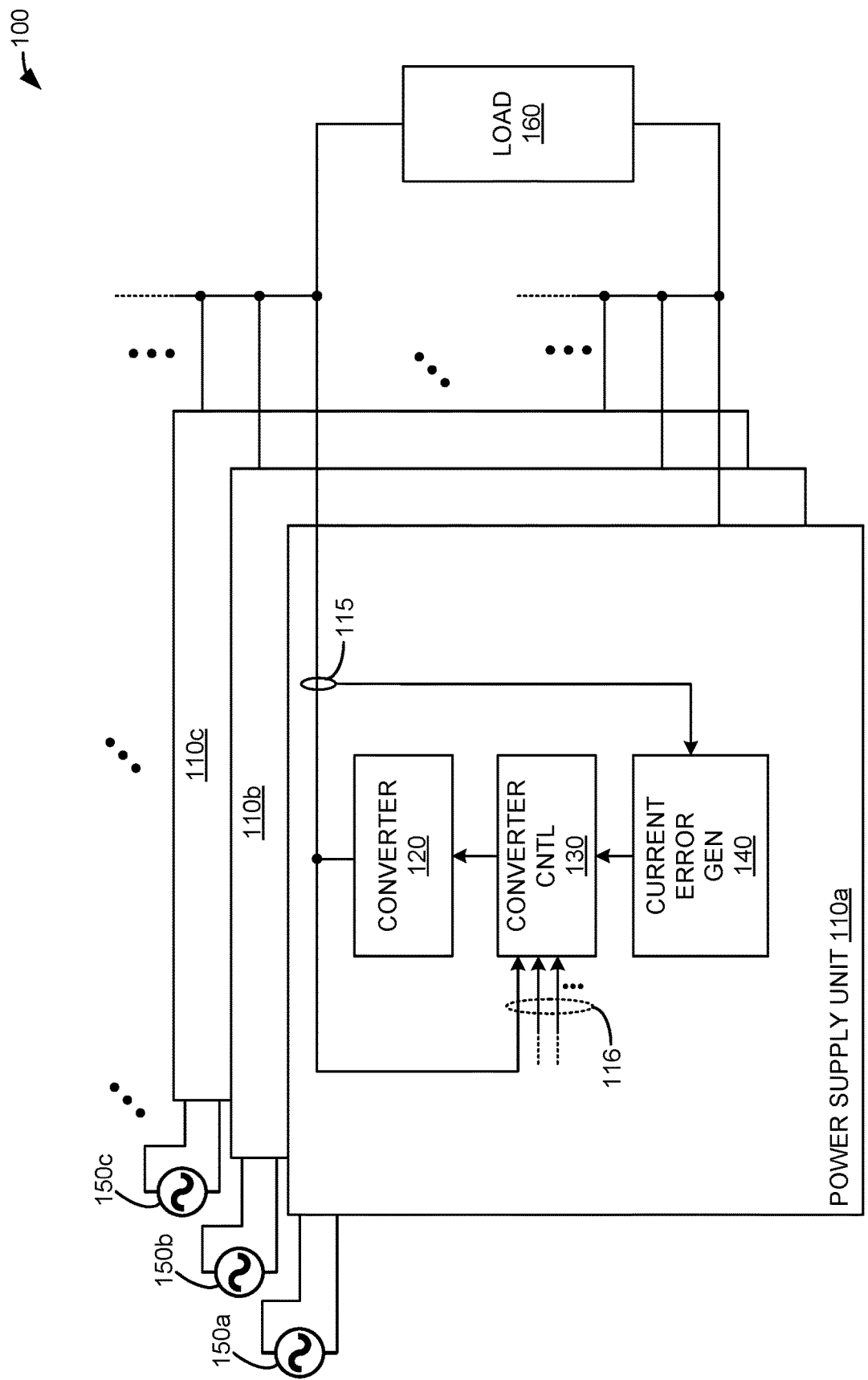
FIG. 1 is a block diagram illustrating a power supply system.

The drawings have not necessarily been drawn to scale. Similarly, some components and/or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Example implementations are provided so that this disclosure will be thorough, and will fully convey the scope to persons skilled in the art. Numerous specific details are set forth such as examples of specific components, devices, and methods, to provide a thorough understanding of implementations of the present disclosure. It will be apparent to those skilled in the art that specific details need not be employed, that example implementations may be embodied in many different forms and that neither should be construed to limit the scope of the disclosure. In some example implementations, well-known processes, well-known device structures, and well-known technologies are not described in detail.

The terminology used herein is for the purpose of describing particular example implementations only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc., may be used herein to describe various elements, components, regions, layers and/or sections, these elements, components, regions, layers and/or sections should not be limited by these terms. These terms may be only used to distinguish one element, component, region, layer or section from another region, layer, or section. Terms such as "first," "second," and other numerical terms when used herein do not imply a sequence or order unless clearly indicated by the context. Thus, a first element, component, region, layer, or section discussed below could be termed a second element, component, region, layer, or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the FIGS. Spatially relative terms may be intended to encompass different orientations of the device in use or operation in addition to the orientation depicted in the FIGS. For example, if the device in the FIGS. is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

In the parallel operation of power supply units, a high line ripple current has been observed in output when the power supply units (PSUs) are supplied with different inputs. For example, a high line ripple current has been observed when PSUs were supplied with different line frequency inputs (e.g., 50 Hz and 60 Hz) and/or when PSUs were supplied with different phase angle input lines (e.g., 90 deg, 120 deg and/or 240 deg phase difference).

In an embodiment, a low pass filter is in a control loop which is capable of filtering the line frequency to get an average current reference signal. The average current reference signal is compared with the real time output current to generate an error signal. This error signal is fed back to a voltage control loop to adjust the output in order to compensate the line ripple.

FIG. 1 is a block diagram illustrating a power supply system. In FIG. 1, power supply system 100 comprises power supply units 110a-110c, line inputs 150a-150c, and load 160. Power supply units 110a-110c receive line inputs 150a-150c, respectively. The power supply output and return (e.g., ground) terminals of power supplies 110a-110c are connected in parallel to share the provision of power supply current at a specified voltage to load 160.

Power supply unit 110a, as an example of power supplies 110a-110c, includes converter 120, converter control 130, current error generation 140, and current sense 115. Current sense 115 is operatively couples to the output of power supply unit 110a, and converter 120, in particular. Current sense 115 may be any device, means, circuit etc. to sense the current flowing to/from power supply unit 110a. For example, current sense 115 may be a resistor coupled to an amplifier to provide a voltage that is proportional to the current being supplied by power supply unit 110a. In another example, current sense 115 may include a hall effect sensor. In another sample, current sense 115 may include a coil electromagnetically coupled to the output of power supply unit 110a to measure the current being supplied by power supply unit 110a. In FIG. 1, current sense 115 is shown as being coupled to the output of power supply unit 110a. This is merely for illustration purposes. Current sense 115 may be coupled to, and/or sensing, the return current from load 160.

Current sense 115 is operatively coupled to current error generation 140. The output of current error generation 140 is operatively coupled to converter control 130. Converter control 130 also receives other control and/or feedback input signals 116. The output of converter control 130 is operatively coupled to converter 120. The output of converter 120 is the output of power supply unit 110a. The output of converter 120 is also fed back to converter control 130. Thus, power supply unit 110a includes at least two feedback loops.

The first feedback loop includes the output voltage of converter 120 and other input signals 116 being fed back to converter control 130 which then controls the output voltage of converter 120. This may be referred to a voltage and current share loop. The second feedback loop includes current sense 115, current error generation 140, converter control 130, and converter 120.

In an embodiment, current error generation 140 averages (filters) the current proportional waveform output by current sense 115 to obtain an average (filtered) current being output by power supply unit 110a. Current error generation 140 compares the average current to the instantaneous (unfiltered) output of current sense 115 to obtain an indicator of the waveform of the ripple current on the output of power supply unit 110a. This ripple current waveform signal is provided to converter control 130. Based on the ripple current waveform signal, converter control 130 controls the output voltage of converter 120 to reduce the amount of ripple current present on the output of power supply unit 110a.

In an embodiment, all or parts of converter control 130 may be provided by software/firmware running on a digital computer/processor. Likewise, all or parts of current error generation may be provided by software/firmware running on a digital computer/processor. For example, a software implemented recursive filter may be used by current error generation to generate the average or filtered version of the current sensed by current sense 115.

Figure 2:
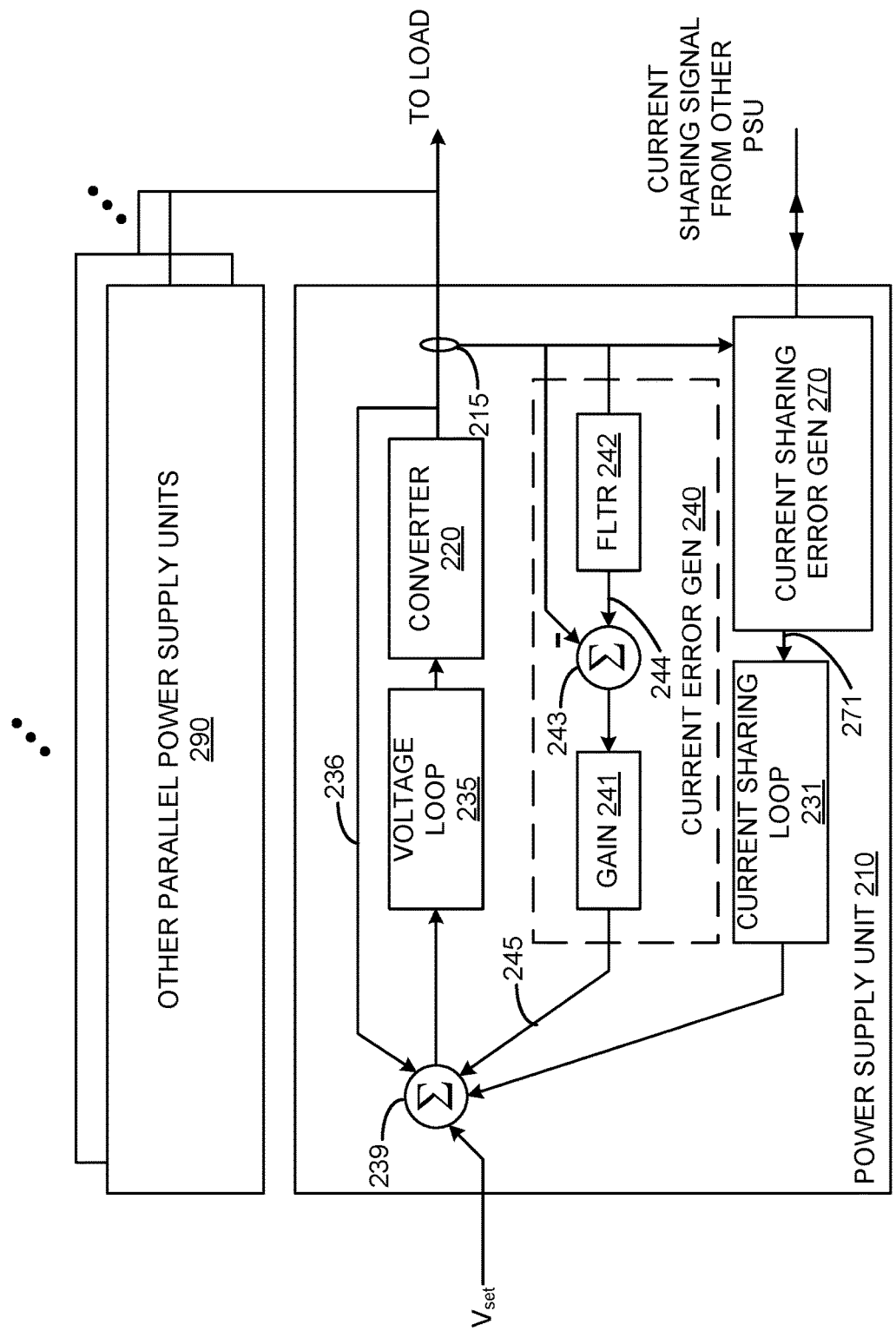
FIG. 2 is a block diagram illustrating a current sharing power supply system.

FIG. 2 is a block diagram illustrating a current sharing power supply system. In FIG. 2, power supply system 200 includes power supply unit 210, and power supply units 290. Power supply unit 210 is operatively connected in parallel with power supply units 290 to supply regulated power supply voltage and current to a load.

In FIG. 2, power supply unit 210 includes current sense 215, converter 220, current sharing loop 231, voltage loop 235, summation function 239, and current error generator 240. Current sense 215 provides a signal that is proportional to the output current of power supply unit 210 to current error generations 240 and current sharing error generation 270. Current sharing loop 231 receives a current sharing error signal 271 from current sharing error generation 270. Current sharing loop provides a current sharing error signal to summation function 239. The output of summation function 239 is provided to voltage loop 235. The output of voltage loop 235 controls converter 220. The output 236 of converter 220 is fed back to summation function 239 thereby forming a feedback loop.

Summation function 239 also receives a control voltage ($V_{set}$) that mostly determines the output voltage of power supply unit 210. Summation function 239 also receives a current error indicator signal 245 from current error generation 240. Thus, the output voltage of power supply unit 210 is determined by $V_{set}$, the current sharing error signal from current sharing loop 231, and the current error signal from current error generation 240.

Current sharing error generator 270 receives an indicator of the current being supplied by each of power supply unit 210 and power supply units 290. Based on this indicator of current, current sharing error generator 270 provides a current sharing error signal to power supply unit 210 This current sharing error signal may be generated by current sharing error generator 270 to "balance" the current supplied by each of power supply unit 210 and power supply units 290. This helps to prevent any single one of power supply unit 210 and power supply units 290 from supplying significantly more current that the others of power supply unit 210 and power supply units 290. Balancing the current loads among power supply unit 210 and power supply units 290 helps increase the time between failures of any of power supply unit 210 and power supply units 290.

Current error generation 240 includes gain function 241, filter 242, and summation function 243. The input to filter 242 is the signal from current sense 215. Filter 242 may implement a low pass filter and/or averaging function. The current reference signal output 244 of filter 242 is provided to summation function 243. The unfiltered signal from current sense 215 is subtracted from the current reference signal output 244 of filter 242 by summation function 243. The output of summation function is amplified or attenuated by gain function 241. The output of gain function 241 is the current error indicator signal 245.

Thus, it should be understood that current error generation 240 averages (filters) the current proportional waveform output by current sense 215 to obtain an average (filtered) current being output by power supply unit 210. Current error generation 240 compares (subtracts) the average current to the instantaneous (unfiltered) output of current sense 215 to obtain an indicator of the waveform of the ripple current on the output of power supply unit 210. This current error indicator signal 245 (which corresponds the ripple current waveform) is provided to summation function 239. Based on the sum of the current error indicator signal 245 and the other inputs to summation function 239, voltage loop 235 controls the output voltage of converter 220 to reduce the amount of ripple current present on the output of power supply unit 210.

In an embodiment, filter 242 is implemented as a digital recursive filter. In particular, filter 242 may have cut off frequency of around 30 Hz which corresponds to input AC line frequencies of 47 Hz to 63 Hz. The formula of filter 242 may be is $y(n)=[x(n)+2^{\wedge}(m)*y(n-1)]/2^{\wedge}(m)$ with m set to 8.

Figure 3:
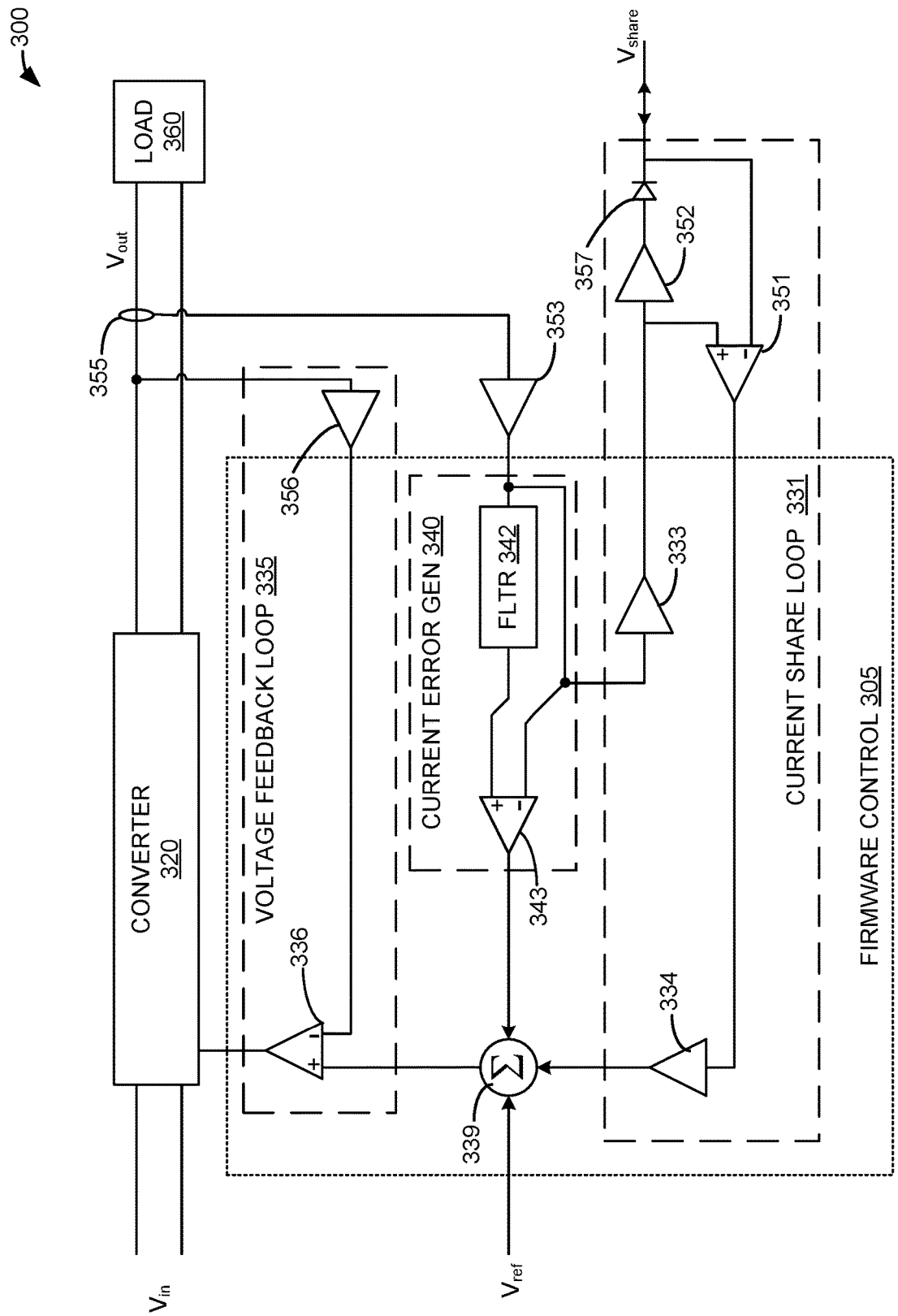
FIG. 3 is a block diagram illustrating a power supply unit.

FIG. 3 is a block diagram illustrating a power supply unit. In FIG. 3, power supply unit 300 comprises firmware control 305, converter 320, differential amplifier 351, amplifier 352, amplifier 353, current sense 355, amplifier 356, diode 357, and load 360. converter 320 receives input supply voltage $V_{in}$. Converter 320 outputs voltage $V_{out}$ to load 360. Current sense 355 is between load 360 and the current return input to converter 320.

Firmware control 305 implements amplifier 333, amplifier 334, differential amplifier 336, summation function 339, filter 342, and differential amplifier 343. The input to amplifier 356 is the output voltage of converter 320, $V_{out}$. The output of amplifier 356 is provided to the inverting input of differential amplifier 336. The non-inverting input of differential amplifier 336 is received from summation function 339. The output of differential amplifier 336 controls converter 320. Thus, amplifier 356 and differential amplifier 336 complete a voltage feedback loop 335 with converter 320 to determine the output voltage $V_{out}$.

The signal from current sense 355 is connected to the input of amplifier 353. The output of amplifier 353 is provided to the input of filter 342, the inverting input of differential amplifier 343, and the input of amplifier 333. The output of amplifier 333 is provided to the input of amplifier 352 and the non-inverting input of differential amplifier 351. The output of amplifier 352 is provided to the anode of diode 357. The voltage at the cathode of diode 357 is provided to, and received from, other circuitry (not shown in FIG. 3) as a current share signal that is proportional to the output current being supplied. The cathode of diode 357 is also connection to the inverting input of differential amplifier 351. The output of differential amplifier 351 is provided to the input of amplifier 334. The output of amplifier 334 is provided to summation function 339. Thus, current sense 355, differential amplifier 353, amplifier 333, amplifier 334, differential amplifier 351, amplifier 352, and $V_{share}$ complete a current sharing feedback loop with voltage loop 335.

The output of amplifier 353 is provided to the input of filter 342 and the inverting input of differential amplifier 343. The output of filter 342 is provided to the non-inverting input of differential amplifier 343. The output of differential amplifier 343 is provided to summation function 339. Thus, current sense 355, amplifier 353, filter 342, and differential amplifier 343 complete a current error 340 feedback loop with voltage loop 335.

In an embodiment, filter 342 is implemented as a digital recursive filter. In particular, filter 342 may have cut off frequency of around 30 Hz which corresponds to input AC line frequencies of 47 Hz to 63 Hz. The formula of filter 342 may be $y(n)=[x(n)+2^{\wedge}(m)*y(n-1)]/2^{\wedge}(m)$ with m set to 8.

FIG. 4 is a flowchart illustrating a method of operating a power supply system. One or more steps illustrated in FIG. 4 may be performed by, for example, power supply system 100, power supply system 200, power supply unit 300, and/or their components. A current sharing error signal based on a difference between at least a first current supplied by the first power supply unit and a second current supplied by a second power supply unit where the first power supply unit and the second power supply unit are connected in parallel to share the supply of a load current (402). For example, power supply unit 210 may receive, a current sharing error signal 271 from current sharing error generation 270 that is based on a difference in the current being supplied to a load by power supply unit 210 and the current being supplied to the load by another power supply unit 290.

A current reference signal and a current feedback signal are received (404). For example, summation function 243 may receive current reference signal output 244 from filter 242 and also receive the unfiltered current proportional signal from current sense 215. Based on the current sharing error signal, the current reference signal, and the current feedback signal, an error input to a voltage control loop that controls the output voltage of the first power supply is adjusted (406). For example, voltage loop 235, which controls the output of power supply unit 210, may receive the output of summation function 239 where the output of summation function 239 is based at least on the output of current sharing loop 231 and the output of current error generation 240.

Figure 5:
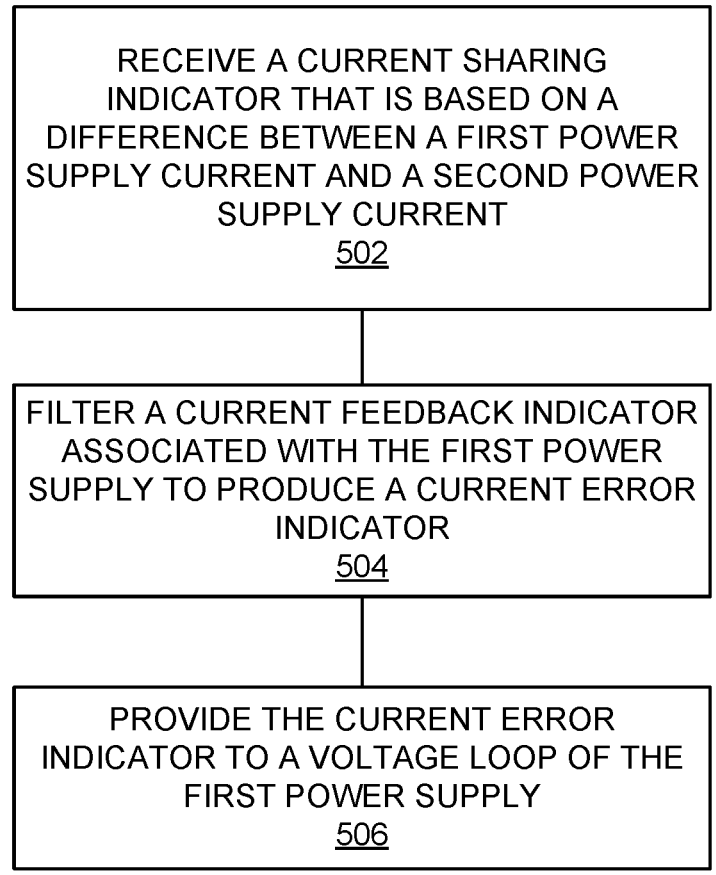
FIG. 5 is a flowchart illustrating a method of operating a power supply unit.

FIG. 5 is a flowchart illustrating a method of operating a power supply unit. One or more steps illustrated in FIG. 5 may be performed by, for example, power supply system 100, power supply system 200, power supply unit 300, and/or their components. A current sharing indicator that is based on a difference between a first power supply current and a second power supply current is received (502). For example, power supply unit 210 may receive, from current sharing error generation 270 a current sharing error signal 271 that is based on a difference in the current being supplied to a load by power supply unit 210 and the current being supplied to the load by another power supply unit 290.

A current feedback indicator associated with the first power supply is filtered to produce a current error indicator (504). For example, the unfiltered current proportional signal from current sense 215 may be filtered by filter 242 and the output of filter 242 subtracted from the unfiltered current proportional signal from current sense 215 to produce a current error indicator signal 245. The current error indicator is provided to a voltage loop of the first power supply (506). For example, the current error indicator signal 245 may be provided to summation function 239 which is part of the voltage feedback loop that controls the output voltage of power supply unit 210.

Figure 6:
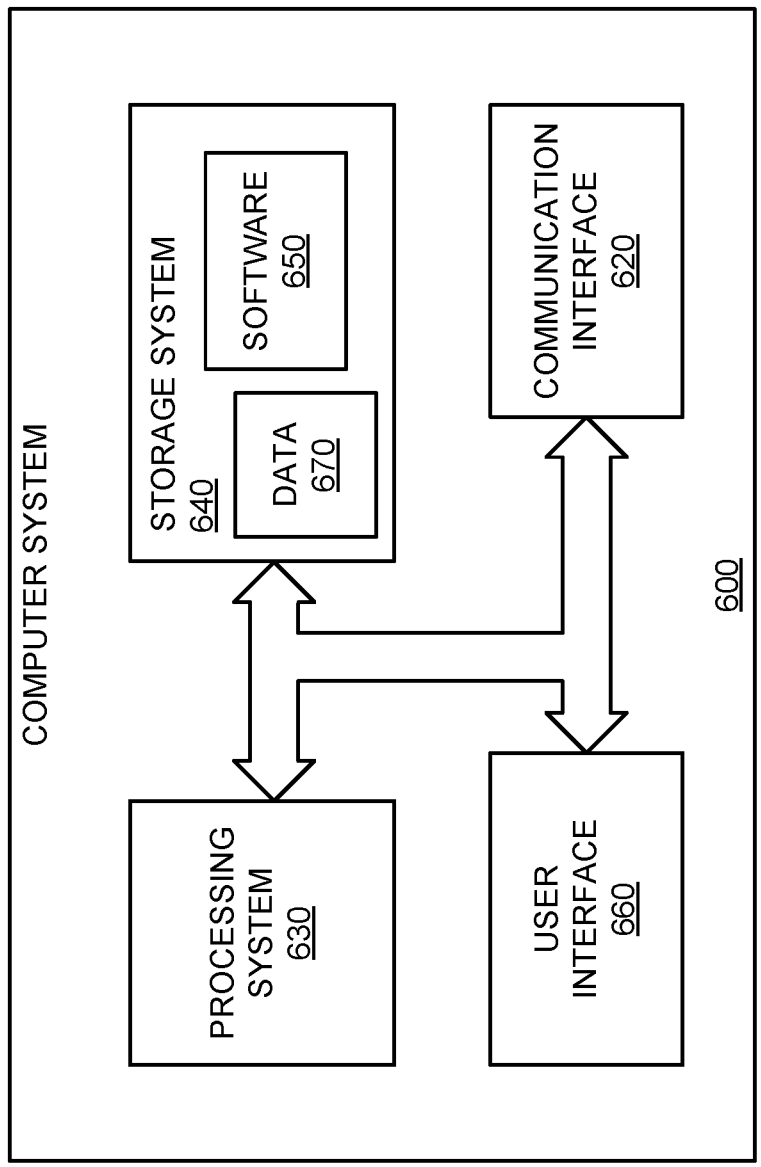
FIG. 6 is a block diagram illustrating a computer system.

FIG. 6 is a block diagram illustrating a computer system. In an embodiment, computer system 600 and/or its components include circuits, software, and/or data that implement, or are used to implement, the methods, systems and/or devices illustrated in the FIGS., the corresponding discussions of the FIGS., and/or are otherwise taught herein. The methods described above may also be stored on a non-transitory computer readable medium. Devices, circuits, and systems described herein may be implemented using computer-aided design tools available in the art, and embodied by computer-readable files containing software descriptions of such circuits. This includes, but is not limited to one or more elements of power supply system 100, power supply system 200, power supply unit 300, and/or their components. These software descriptions may be: behavioral, register transfer, logic component, transistor, and layout geometry-level descriptions.

Data formats in which such descriptions may be implemented are stored on a non-transitory computer readable medium include, but are not limited to: formats supporting behavioral languages like C, formats supporting register transfer level (RTL) languages like Verilog and VHDL, formats supporting geometry description languages (such as GDSII, GDSIII, GDSIV, CIF, and MEBES), and other suitable formats and languages. Physical files may be implemented on non-transitory machine-readable media such as: 4 mm magnetic tape, 8 mm magnetic tape, 3½-inch floppy media, CDs, DVDs, hard disk drives, solid-state disk drives, solid-state memory, flash drives, and so on.

Alternatively, or in addition, the functionally described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), multi-core processors, graphics processing units (GPUs), etc.

FIG. 6 illustrates a block diagram of an example computer system. Computer system 600 includes communication interface 620, processing system 630, storage system 640, and user interface 660. Processing system 630 is operatively coupled to storage system 640. Storage system 640 stores software 650 and data 670. Processing system 630 is operatively coupled to communication interface 620 and user interface 660. Computer system 600 may comprise a programmed general-purpose computer. Computer system 600 may include a microprocessor. Computer system 600 may comprise programmable or special purpose circuitry. Computer system 600 may be distributed among multiple devices, processors, storage, and/or interfaces that together comprise elements 620-670.

Communication interface 620 may comprise a network interface, modem, port, bus, link, transceiver, or other communication device. Communication interface 620 may be distributed among multiple communication devices. Processing system 630 may comprise a microprocessor, microcontroller, logic circuit, or other processing device. Processing system 630 may be distributed among multiple processing devices. User interface 660 may comprise a keyboard, mouse, voice recognition interface, microphone and speakers, graphical display, touch screen, or other type of user interface device. User interface 660 may be distributed among multiple interface devices. Storage system 640 may comprise a disk, tape, integrated circuit, RAM, ROM, EEPROM, flash memory, network storage, server, or other memory function. Storage system 640 may include computer readable medium. Storage system 640 may be distributed among multiple memory devices.

Processing system 630 retrieves and executes software 650 from storage system 640. Processing system 630 may retrieve and store data 670. Processing system 630 may also retrieve and store data via communication interface 620. Processing system 650 may create or modify software 650 or data 670 to achieve a tangible result. Processing system may control communication interface 620 or user interface 660 to achieve a tangible result. Processing system 630 may retrieve and execute remotely stored software via communication interface 620.

Software 650 and remotely stored software may comprise an operating system, utilities, drivers, networking software, and other software typically executed by a computer system. Software 650 may comprise an application program, applet, firmware, or other form of machine-readable processing instructions typically executed by a computer system. When executed by processing system 630, software 650 or remotely stored software may direct computer system 600 to operate as described herein.

Implementations discussed herein include, but are not limited to, the following examples:

Example 1: A direct current (DC) power supply system, comprising: a plurality of power supply units configured in parallel to share load current; and, the plurality of power supply units comprising: a first power supply unit to combine a current feedback signal and a current reference signal to produce a first current error signal that affects a voltage control loop of the first power supply unit.

Example 2: The power supply system of example 1, wherein at least two of the plurality of power supply units receive AC line voltages oscillating at different frequencies.

Example 3: The power supply system of example 1, wherein at least two of the plurality of power supply units receive AC line voltages having different phases.

Example 4: The power supply system of example 2, further comprising: a filter to produce the current reference signal from the current feedback signal.

Example 5: The power supply system of example 4, wherein the filter is a low pass filter.

Example 6: The power supply system of example 4, wherein the filter is a recursive low pass filter.

Example 7: The power supply system of example 4, wherein a cutoff frequency of the filter is selected based on at least one frequency of the AC line voltages oscillating at different frequencies.

Example 8: A method of controlling a first power supply unit, comprising: receiving a current sharing error signal based on a difference between at least a first current supplied by the first power supply unit and a second current supplied by a second power supply unit where the first power supply unit and the second power supply unit are connected in parallel to share a supplying of a load current; receiving a current reference signal and a current feedback signal; and, based on the current sharing error signal, the current reference signal, and the current feedback signal, adjusting an error input to a voltage control loop that controls an output voltage of the first power supply unit.

Example 9: The method of example 8, wherein the first power supply unit receives a first AC line input signal and the second power supply unit receives a second AC line input signal.

Example 10: The method of example 9, wherein the first AC line input signal and the second AC line input signal have characteristics that are different by at least one of AC frequency and AC phase.

Example 11: The method of example 10, further comprising: filtering the current feedback signal to produce the current reference signal.

Example 12: The method of example 11, wherein the filtering comprises at least low pass filtering.

Example 13: The method of example 12, wherein the filtering implements at least a recursive low pass filter.

Example 14: The method of example 13, wherein a cutoff frequency of the recursive low pass filter is selected based on at least an AC frequency of the first AC line input signal.

Example 15: A power supply system, comprising: control circuitry configured to receiving a current sharing error indicator that is based on a difference between at least a first current supplied by a first power supply unit and a second current supplied by a second power supply unit where the first power supply unit and the second power supply unit are connected in parallel to share a supplying of a load current; the control circuitry further configure to receive a current reference indicator and a current feedback indicator; and, based on the current sharing error indicator, the current reference indicator, and the current feedback indicator, the control circuitry is to adjust an error input indicator to a voltage control loop that controls an output voltage of the first power supply unit.

Example 16: The power supply system of example 15, wherein the first power supply unit is to receive first AC line input signal and the second power supply unit receives a second AC line input signal where the first AC line input signal and the second AC line input signal have characteristics that are different by at least one of AC frequency and AC phase.

Example 17: The power supply system of example 16, wherein the control circuitry implements a filtering to filter the current feedback indicator to produce the current reference indicator.

Example 18: The power supply system of example 17, wherein the filtering comprises at least low pass filtering.

Example 19: The power supply system of example 17, wherein the filtering implements at least a recursive low pass filter.

Example 20: The power supply system of example 17, wherein a cutoff frequency of the filtering is selected based on at least an AC frequency of the first AC line input signal.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The included descriptions and FIGS. depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the disclosure. Those skilled in the art will also appreciate that the features described above may be combined in various ways to form multiple embodiments. As a result, the invention is not limited to the specific embodiments described above, but only by the claims and their equivalents.

What is claimed is:

1. A direct current (DC) power supply system, comprising:
   a plurality of power supply units configured in parallel to share load current; and,
   the plurality of power supply units comprising:
      a first power supply unit to combine a current feedback signal and a current reference signal to produce a first current error signal that affects a voltage control loop of the first power supply unit;
   wherein at least two of the plurality of power supply units receive AC line voltages oscillating at different frequencies.

2. The power supply system of claim 1, wherein at least two of the plurality of power supply units receive AC line voltages having different phases.

3. The power supply system of claim 1, further comprising:
   a filter to produce the current reference signal from the current feedback signal.

4. The power supply system of claim 3, wherein the filter is a low pass filter.

5. The power supply system of claim 3, wherein the filter is a recursive low pass filter.

6. The power supply system of claim 3, wherein a cutoff frequency of the filter is selected based on at least one frequency of the AC line voltages oscillating at different frequencies.

7. A method of controlling a first power supply unit, comprising:

receiving a current sharing error signal based on a difference between at least a first current supplied by the first power supply unit and a second current supplied by a second power supply unit where the first power supply unit and the second power supply unit are connected in parallel to share a supplying of a load current;

receiving a current reference signal and a current feedback signal; and, based on the current sharing error signal, the current reference signal, and the current feedback signal, adjusting an error input to a voltage control loop that controls an output voltage of the first power supply unit.

8. The method of claim 7, wherein the first power supply unit receives a first AC line input signal and the second power supply unit receives a second AC line input signal.

9. The method of claim 8, wherein the first AC line input signal and the second AC line input signal have characteristics that are different by at least one of AC frequency and AC phase.

10. The method of claim 9, further comprising:

filtering the current feedback signal to produce the current reference signal.

11. The method of claim 10, wherein the filtering comprises at least low pass filtering.

12. The method of claim 11, wherein the filtering implements at least a recursive low pass filter.

13. The method of claim 12, wherein a cutoff frequency of the recursive low pass filter is selected based on at least an AC frequency of the first AC line input signal.

14. A power supply system, comprising:

control circuitry configured to receiving a current sharing error indicator that is based on a difference between at least a first current supplied by a first power supply unit and a second current supplied by a second power supply unit where the first power supply unit and the second power supply unit are connected in parallel to share a supplying of a load current;

the control circuitry further configured to receive a current reference indicator and a current feedback indicator; and, based on the current sharing error indicator, the current reference indicator, and the current feedback indicator, the control circuitry is to adjust an error input indicator to a voltage control loop that controls an output voltage of the first power supply unit.

15. The power supply system of claim 14, wherein the first power supply unit is to receive first AC line input signal and the second power supply unit receives a second AC line input signal where the first AC line input signal and the second AC line input signal have characteristics that are different by at least one of AC frequency and AC phase.

16. The power supply system of claim 15, wherein the control circuitry implements a filtering to filter the current feedback indicator to produce the current reference indicator.

17. The power supply system of claim 16, wherein the filtering comprises at least low pass filtering.

18. The power supply system of claim 16, wherein the filtering implements at least a recursive low pass filter.

19. The power supply system of claim 16, wherein a cutoff frequency of the filtering is selected based on at least an AC frequency of the first AC line input signal.

20. A direct current (DC) power supply system, comprising:

a plurality of power supply units configured in parallel to share load current; and, the plurality of power supply units comprising:

a first power supply unit to combine a current feedback signal and a current reference signal to produce a first current error signal that affects a voltage control loop of the first power supply unit;

wherein at least two of the plurality of power supply units receive AC line voltages having different phases.

* * * * *